United States Patent [19]
McGee, Jr.

[11] 3,775,893
[45] Dec. 4, 1973

[54] TROTLINE DISPENSER

[76] Inventor: Roger V. McGee, Jr., 6011 Gaston, Apt. 216, Dallas, Tex.

[22] Filed: Aug. 19, 1971

[21] Appl. No.: 173,041

[52] U.S. Cl.............................. 43/54.5 A, 43/27.4
[51] Int. Cl.............................................. A01k 97/06
[58] Field of Search................... 43/54.5 A, 54.5 R, 43/27.4

[56] References Cited
UNITED STATES PATENTS

| | | | |
|---|---|---|---|
| 2,041,322 | 5/1936 | Cantini | 43/54.5 A |
| 2,629,197 | 2/1953 | Duvall | 43/54.5 A |
| 3,486,267 | 12/1969 | Hitre | 43/54.5 R |

Primary Examiner—Warner H. Camp
Attorney—Richards, Harris & Hubbard

[57] ABSTRACT

A trotline dispensing device includes a fixed spool having a recessed reel section for receiving a trotline wound thereupon, and a series of hook-retaining compartments positioned on one end of the spool and opening longitudinally of the spool for releasably retaining either unbaited or baited fishhooks of the trotline. A retaining member, such as a handle, is carried at the opposite end of the spool. The trotline is dispensed from the apparatus by pulling the trotline longitudinally from the reel (parallel to the axis of the reel), thereby removing hooks sequentially from the hook-retaining compartments.

10 Claims, 4 Drawing Figures

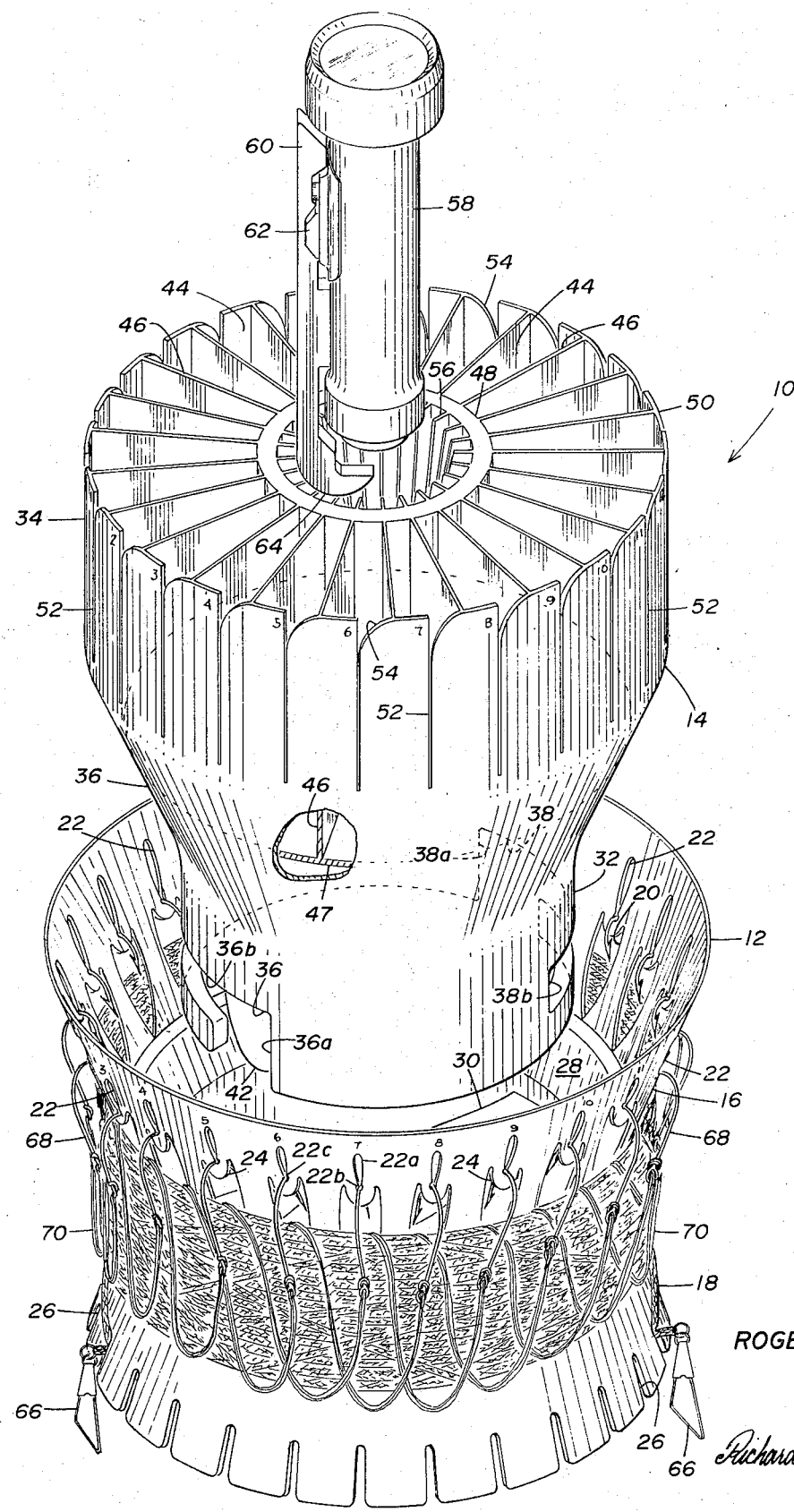
FIG. I
INVENTOR:
ROGER V. McGEE, JR.
ATTORNEYS

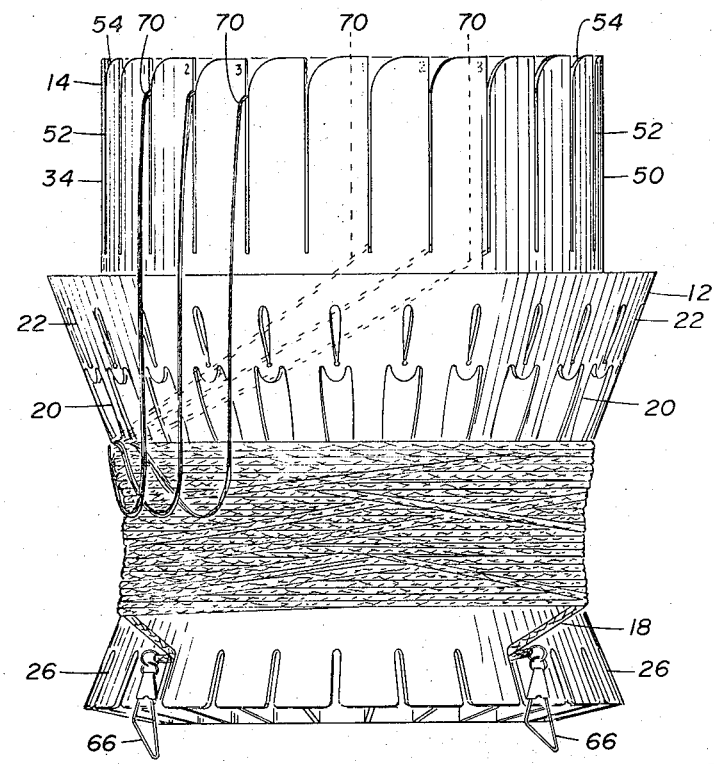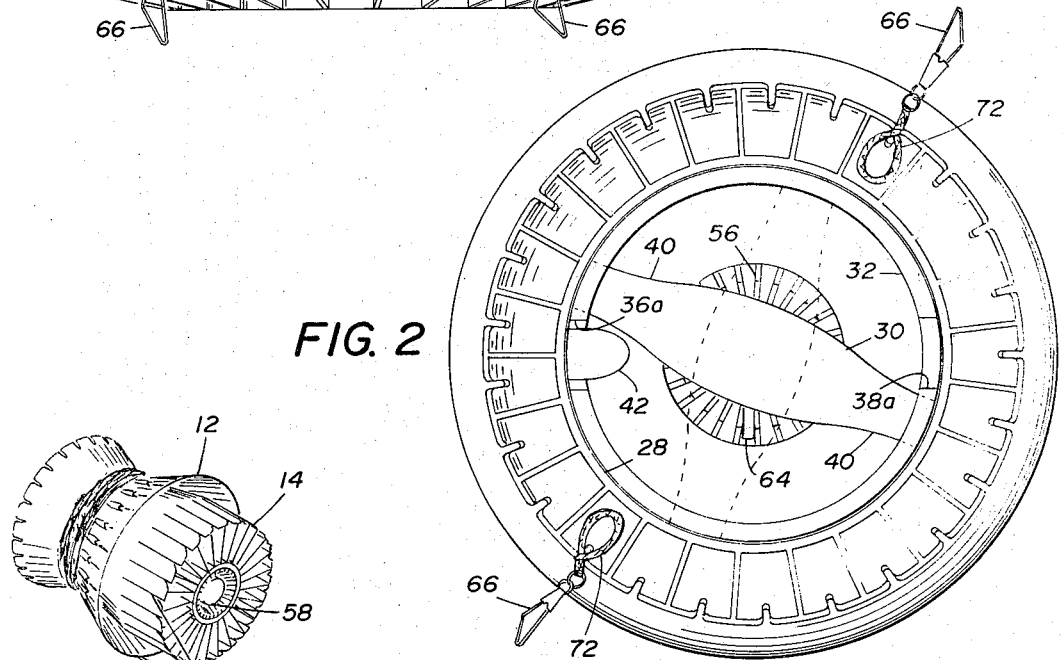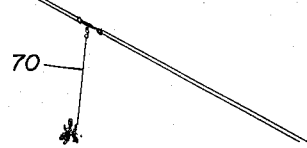

TROTLINE DISPENSER

This invention relates to fishline handling devices. In another aspect, this invention relates to a novel trotline dispensing device. In still another aspect, this invention relates to an improved automatic trotline dispensing device which will dispense a fully baited trotline.

Trotline fishing includes the use of a fishing line which is provided with a number of hooks. These hooks are secured to the fishing line by short connecting leaders which are spaced along the length of the fishing line. The trotline is customarily secured to supports in a body of water such as a stream. The handling of the trotline is customarily cumbersome because of the number of hook-carrying leaders which are attached along the line. In addition, handling of a trotline can be dangerous, as there are several hooks that must be controlled during the setting, baiting and retrieving operations. A conventional method of setting a trotline from a boat is to initially attach one end of the line to an anchor or support and then proceed from the anchor or support in the boat while paying out the trotline. The hook-carrying leaders are attached to the trotline at spaced intervals as the trotline is payed out. The trotline retrieving operation is conventionally the reverse of the setting operation, wherein the hook-carrying leaders are sequentially removed from the trotline as it is removed from the water.

Various articles have been devised for both storing and dispensing trotlines. However, such trotline containers as disclosed in U.S. Pat. No. 2,708,326 are not adapted to automatically dispense a trotline from a boat. Most devices which are adapted to dispense a trotline from a boat are generally cumbersome and not adapted to efficiently dispense a baited trotline.

One object of this invention is to provide an improved trotline dispensing apparatus.

Another object of this invention is to provide an improved trotline dispensing apparatus which will efficiently and safely set out a prebaited trotline in a rapid one-pass operation.

According to the invention, a trotline dispensing apparatus is provided which includes a fixed spool having a first end and a second end with a recessed reel section therebetween, and a series of fishhook-retaining compartments positioned adjacent the first end of the spool whereby each compartment opens longitudinally of the reel. A handle member is conveniently provided in the second end of the spool.

According to one embodiment of this invention, the spool in the above-decscribed trotline dispensing apparatus is carried on an outer drum section and the fishhook retaining compartments are carried by an inner drum section which is adapted to fit within the outer drum section in interlocking relationship. The outer drum section carries a series of hook-retaining members spaced about the periphery which corresponds to the series of hook-retaining compartments on the inner drum section such that when the two sections are unconnected, the hooks can be safely held by the hook-retaining members on the outer drum section. When the two drum sections are interlocked, the hooks can be disengaged from the hook-retaining members on the outer drum section, baited and placed in corresponding hook-retaining compartments on the inner drum section. In addition, the outer and inner drum sections while interlocked are rotatable between first and second positions such that in the first position the hook-retaining members on the outer drum section are generally aligned with corresponding fishhook-retaining compartments of the inner drum section and when rotated to a second position, are offset so that when the fishhooks are retained in the fishhook-retaining compartments the leaders are pulled taut.

In a further embodiment of this invention a light is provided which is operatively positioned axially through the fixed spool to thereby allow the operator not only to dispense the trotline with one hand but also to actuate and deactuate the light to thereby illuminate the area when the trotline is set out or retrieved in the nighttime.

This invention can be more easily understood from a study of the drawings in which:

FIG. 1 is an exploded view of a preferred trotline dispensing apparatus of this invention;

FIG. 2 is a bottom view of the apparatus of FIG. 1;

FIG. 3 is an elevational view of the trotline dispensing apparatus of FIG. 1; and FIG. 4 is a perspective view of the apparatus of FIG. 1, illustrating a trotline being dispensed therefrom.

Now referring to FIG. 1, the trotline dispensing device 10 generally comprises outer drum section 12 which operatively connects with inner drum section 14. Both drum sections 12 and 14 can be made of any suitable material but are preferably molded from either a thermosetting or thermoplastic polymeric material.

As shown in FIGS. 1–3, outer drum section 12 generally carries recessed reel section 16 about its midportion for receiving a trotline 18 wound thereupon. The configuration of outer drum section 12 as illustrated in the drawings, can basically be described as two frustoconical sections joined at their apexes (narrow ends). Outer drum section 12 is generally fluted by cutouts 20 which not only cause recessed reel section 16 to be flexible to compensate for the shrinkage and elongation of trotline 18, but also allow trotline 18 to adequately contact the atmosphere and dry after it is retrieved from a body of water.

Cutouts 20 extend around the lower portion of fishhook-retaining members 22 to thereby form extensions 24, as shown in FIG. 1. Fishhook-retaining members 22 generally comprise an upper teardrop-shaped section 22a operatively communicating with a lower rounded section 22b through clip section 22c.

The lower outer periphery of outer drum section 12 carries a series of notches 26 which serve to retain the ends of trotline 18. Reinforcing ring 28 is positioned around the lower half of the inner periphery of outer drum section 12, and carries handle 30 (FIG. 2) operatively attached thereto.

Inner drum section 14 comprises a lower cylindrical portion 32 adapted to extend within the interior of outer drum section 12 and an upper cylindrical portion 34. As shown, lower cylindrical portion 32 and upper cylindrical portion 34 are joined by sloping sidewalls.

Lower cylindrical portion 32 carries a pair of L-shaped locking slots 36 and 38 for interconnecting outer drum section 12 with inner drum section 14.

Each locking slot 36 and 38 comprises a lower leg 36a and 38a, respectively, and an upper leg 36b and 38b, respectively. Locking slots 36 and 38 are in opposed positions through the lower cylindrical portion 32. Thus, lower legs 36a and 38a are positioned directly opposite and upper legs 36b and 38b are positioned directly opposite on the circumference of lower cylindrical portion 32. Resilient locking tab 42 is positioned at the base of lower leg 36a and will yield inwardly (toward the interior of inner drum section 14).

Upper cylindrical portion 34 carries a series of fishhook-retaining compartments 44 which open longitudinally thereof (generally parallel to the axis of both inner drum section 14 and outer drum section 12). As shown, each fishhook-retaining compartment 44 is formed by a pair of radial sidewalls 46 extending from reinforcing ring 48 to outer sidewall 50 of cylindrical section 14. Preferably, the bottoms of fishhook-retaining compartments 44 are enclosed by bottom section 47. This will allow water to be contained within each fishhook-retaining compartment so that the fishhooks can be baited with live bait, as will be explained below.

Leader-retaining slots 52 are positioned sequentially through outer sidewall 50 to communicate with each fishhook-retaining compartment 44. Rounded sections 54 are carried by alternate sidewall portions adjacent leader-retaining slots 52, as shown in the drawings. A series of vanes 56 extend inwardly from reinforcing ring 48. The inside ends of vanes 56 are shaped such that they will receive flashlight 58 and an interference fit when it is forced axially into the interior of inner drum section 14. Switch-arm 60 is shaped on one side to generally conform to the external configuration of flashlight switch 62, and carries an extended trigger 64. Thus, switcharm 60 can be positioned between a pair of vanes 56 as flashlight 58 is pressed into the axis of inner drum section 14 and in interference fit with the ends of vanes 56. Switcharm 60 extends through the interior of inner drum section 14 such that trigger 64 is positioned beneath handle 30 of outer drum section 12 when the two drum sections 12 and 14 are interconnected.

In the operation of the trotline dispensing apparatus 10 of this invention, trotline 18 is initially wound upon recessed reel section 16 of outer drum section 12 by initially retaining the leading end of trotline 18 in a notch 26, as illustrated in FIGS. 1 and 2. Both ends of trotline 18 preferably carry snap fasteners 66. The trotline is doubled and then forced within slot 26 in interference fit. Next, the trotline 18 is wound around the recessed reel section 16. The fishhooks 68 carried by corresponding leaders 70 on trotline 18 are sequentially positioned within fishhook-retaining members 22 as trotline 18 is wound upon recessed reel section 16. Each hook is positioned within a fishhook-retaining member 22 by passing the point of the hook through the upper teardrop section 22a and pulling the hook downward through clip section 22c to thereby force the bight of the hook into the rounded retaining portion 22b. This procedure is continued until the trotline is completely wound upon the outer drum section 12. The trailing end of trotline 18 (which will obviously be the leading end of the trotline as it is dispensed from apparatus 10) is then retained by a notch 26 by doubling the trotline and forcing it into notch 26 in the same manner as the other end thereof was retained. This action leaves small loops 72 of trotline 18 projecting toward the interior of outer drum section 12 and snap fasteners 66 freely suspended from each notch 26.

The above procedure for loading trotline 18 on outer drum section 12 can be accomplished when outer drum section 12 is either attached or detached from inner drum section 14.

Inner drum section 14 is interconnected with its outer drum section 12 by passing narrow sections 40 of handle 30 within the lower legs 36a and 38a of locking slots 36 and 38, respectively. Insertion of section 40 within lower leg 36a of locking slot 36, causes a depression of resilient locking tab 42 which is operatively positioned at the base of lower leg 36a of locking slot 36. Thus, resilient locking tab 42 depresses inwardly (toward the inside of inner drum section 14) as pressure is applied thereto. The inner drum section 14 is then rotated relative to the outer drum section 12 such that narrow sections 40 of handle 30 pass into upper legs 36b and 38b of locking slots 36 and 38, respectively. This action causes resilient locking tab 42 to spring back inwardly into lower leg 36a of locking slot 36 and thereby retain sections 40 of handle 30 within upper legs 36b and 38b of locking slots 36 and 38, respectively. The interconnected drum sections 12 and 14 can be rotated between a first or " load" position to a second or "unload" position, as will be described in detail below.

The fully assembled and connected apparatus is illustrated in FIG. 3.

When it is desired to set out the trotline 18 by use of trotline dispensing device 10, hooks 68 are initially removed from hook-retaining members 22 and positioned within corresponding compartments 44. This is done by initially positioning inner drum section 14 and outer drum section 12 at the first or "load" position. This "load" position is illustrated in FIGS. 2 and 3, whereby the drum sections 12 and 14 are rotated relative to each other and sections 40 of handle 30 of outer drum section 12 is positioned adjacent the lower legs 36a and 38a of L-shaped locking slots 36 and 38, respectively. In this position, fishhooks 68 are removed from fishhook-retaining members 22 (see the small arabic numbers in FIGS. 1–3) and moved upwardly to corresponding fishhook-retaining compartments 44. If desired, the fishhooks can be prebaited with shrimp, chicken hearts, or any other suitable fish bait. Also, live bait such as minnows can be utilized. In this instance, each fishhook-retaining compartment is filled with water up to the bottom of each leader-retaining notch 52. The fishhooks are then inserted within the corresponding fishhook-retaining compartments 44 and the leaders 70 are forced downwardly into leader-retaining notches 52. Preferably, each leader 70 is positioned in a leader-retaining notch 52 at a point adjacent its connection with the eye of each respective fishhook 68. The leader-retaining notches 52 are smaller in width than the diameter of leaders 70 and thus an interference or friction-type fit results between leaders 70 and leader-retaining notches 52. After the fishhooks 68 are all placed within corresponding fishhook-retaining compartments, then inner drum section 14 is rotated relative to outer drum section 12 to the second or "unload" position. The position of leaders 70 in the "unload" position are illustrated by broken lines in FIG. 3. As shown, leaders 70 are drawn taut by the action of positioning inner drum section 14 and outer drum section 12 in their second positions. In addition, the position of outer drum section 12 with relation to inner drum section 14 is illustrated by the position of handle 30 (in broken line) in FIG. 2 when the two drum sections are in the second or "unload" position. Thus, in this position sections 40 of handle 30 are moved to the outer ends of upper legs 36b and 38b of L-shaped locking slots 36 and 38, respectively.

When it is desired to dispense trotline 18, the free or leading end of trotline 18 is removed from its notch 26 by pulling downwardly on a snap fastener 66. The free end is then secured to a suitable object such as a tree trunk or anchor. The fisherman can then grasp handle 30 and position himself within a boat and move away from the fixed end of trotline 18 while pointing fishhook-retaining compartments 44 toward the fixed end of trotline 18. This action is generally illustrated in FIG. 4. Trotline 18 will spin from the fixed recessed reel section 16 and each leader 70 is sequentially pulled from a leader-retaining notch 52 to thereby free its hook 69 from a hook-retaining compartment 44. This action of course, results in the trotline automatically dispensing from device 10 as the device 10 is moved away from the anchored end of trotline 18. Two or more trotlines can be sequentially dispensed from two or more devices 10 by connecting the trailing end of a first trotline to the leading end of a second trotline, etc.

It is noted that the external configuration of recessed reel section 16 carried by outer drum section 12 can be varied within the scope of this invention. Preferably, outer drum section 12 has a general outer configuration of a pair of frustoconical sections joined axially at the apexes (their narrow ends). However, any other suitable configuration can be used within the scope of this invention. It is only necessary that the recessed reel section 16 is smaller in diameter than the outer diameter of the fixed spool. Thus, the recessed reel section 16 can have any smoothly curved concave shape, for example.

While this invention has been described in relation to its preferred embodiments, it is to be understood that various modifications thereof will be apparent to one skilled in the art upon reading this specification and it is intended to cover such modifications as fall within the scope of the appended claims.

I claim:

1. A trotline dispensing apparatus comprising:
   a. a fixed spool having a first end and a second end with a recessed reel section therebetween for receiving a trotline wound thereupon, said trotline having a series of hook-carrying leaders sequentially positioned thereon; and
   b. a series of hook-retaining compartments positioned adjacent said first end, each compartment comprising a space enclosed by sidewalls and opening longitudinally of said spool, and a retaining means for each of said hook-retaining compartments which comprises a longitudinal slot communicating with the opening of each of said hook-retaining compartments on a sidewall adjacent the periphery of said spool for frictionally engaging and releasably retaining a leader of said trotline when inserted therewithin.

2. The trotline dispensing apparatus of claim 1 wherein said reel section is carried on an outer drum section, and said fishhook-retaining compartments are carried by an inner drum section adapted to fit within said outer drum section in interlocking relationship.

3. The trotline dispensing apparatus of claim 2 wherein said outer drum section carries a series of hook-retaining members corresponding to said series of hook-retaining compartments, said series of hook-retaining members are spaced about the periphery of said outer drum section to sequentially receive said fishhooks suspended from said leaders attached to said trotline wound upon said reel section.

4. The trotline dispensing apparatus of claim 3 further comprising means for pulling taut said leaders between said retaining means of said fishhook compartment and said reel section.

5. A trotline dispensing apparatus comprising:
   a. a fixed spool having a first end and a second end with a recessed reel section therebetween for receiving a trotline wound thereupon, said trotline having a series of hook-carrying leaders sequentially positioned thereon;
   b. a series of fishhook compartments positioned around the outer periphery of said first end, each said fishhook compartment comprising a space enclosed by sidewalls and opening longitudinally of said spool;
   c. retaining means for each of said fishhook compartments comprising a longitudinal slot communicating with the opening of each of said hook-retaining compartments through a sidewall adjacent the periphery of said spool for frictionally engaging a leader of said trotline when inserted therewithin; and
   d. a handle member operatively positioned at said second end.

6. The trotline dispensing apparatus of claim 5 wherein said reel section is carried on an outer drum section and said fishhook compartments are carried by an inner drum section adapted to fit within said outer drum section in interlocking relationship.

7. The trotline dispensing apparatus of claim 6 wherein said outer drum section carries a series of hook-retaining members corresponding to said series of hook-retaining compartments, said series of hook-retaining members are spaced about the periphery of said outer drum section to sequentially receive said fishhooks suspended from said leaders attached to said trotline wound upon said reel section.

8. The trotline dispensing apparatus of claim 7 wherein said outer and inner drum sections, when interlocked, are movable with respect to each other between first and second positions to thereby pull taut leaders extending from said reel section to said retaining means.

9. The trotline dispensing apparatus of claim 8 further comprising a flashlight positioned axially through said fixed spool having a trigger means for actuating and deactuating said light positioned adjacent said handle member.

10. The trotline dispensing apparatus of claim 5 further comprising a bottom closure section for each of said fishhook compartments spaced below said retaining means.

* * * * *